3,282,747
ANNEALING CUBE TEXTURE IRON-SILICON SHEETS
Karl Foster, Wilkins Township, and Alex Goldman, Pittsburgh, Pa., assignors to Westinghouse Electric Corporation, Pittsburgh, Pa., a corporation of Pennsylvania
No Drawing. Filed Apr. 13, 1964, Ser. No. 359,459
13 Claims. (Cl. 148—113)

This application is a continuation-in-part of application Serial No. 208,632, filed July 9, 1962.

This invention is directed to the annealing of iron-silicon sheets to develop a high proportion of (100) [001] texture in the sheet during the transformation anneal thereof.

The production of cube texture iron-silicon sheets on a commercial scale has recently become practicable. In a copending application Serial No. 154,803, now abandoned, filed November 24, 1961 by Wiener et al., are disclosed critical compositions for iron-silicon electrical steels particularly suitable for the development of cube texture. As is pointed out in the copending application, a separating material is required to prevent sticking of adjacent surfaces during the annealing of stacks of sheets or coils. If the desired cube texture orientation in the sheets is to be obtained, the surface of the sheets must be maintained in a clean and bright condition throughout the anneal, and therefore, the coating used must be essentially non-reactive with the metal during the anneal. That application discloses that a relatively coarse grade of alumina (about 100 mesh) applied dry has proven to be a most satisfactory annealing separator.

However, in order to adapt the process for automated high production shop techniques, such as coating and handling coils weighing hundreds of pounds, the dry powder method is not commercially practical, since it is difficult to apply uniformly and it is even more difficult to retain a uniform distribution of the separating material in handling of the sheets. For automated processes of the kind contemplated and employed in industry it is desired to apply the coating in the form of a fluid slurry which may be uniformly applied without difficulty and which tends to remain in place. In order to form such a suitable slurry the powder will ordinarily have an average particle size of from about 200 to 400 mesh fineness.

When Bayer process alumina powder (the most readily available alumina) of appropriate fineness is employed in a slurry, it is found that an unexpected reaction occurs between the alumina powder and the surface of the sheet during the orientation anneal and prevents the necessary secondary growth of cube grains. The reaction results in the undesirable formation of a glassy or slag film on the iron-silicon sheets. It is believed that such glassy film may be the product of a reaction between the silicon and/or iron in the sheets and the alumina of the coating. The reaction is not entirely understood, but the films thus formed are invariably associated with partial or complete failure of the iron-silicon alloy to transform to cube texture. Another phenomenon which is observed with some alumina powders produced by the "Bayer process" is termed "self-adherence," which is the sintering of the particles of the coating to each other thereby producing a substantially impervious layer of alumina which inhibits transformation to cube texture.

Accordingly, it is a primary object of this invention to provide in the annealing of iron-silicon sheets to obtain the cube texture, an alumina powder of appropriate fineness for use in slurry forms to coat iron-silicon sheets as a separator therefor during the annealing of stacks of sheets or coils, the alumina not reacting adversely nor seriously inhibiting the growth of cube texture grains in the sheets.

It is another object of this invention to provide processes for making and/or improving alumina powder of appropriate fineness for use as a separating material during the annealing of iron-silicon sheets and coils which will not inhibit the growth of cube texture grains in the iron-silicon sheets and coils.

Other objects of the invention will, in part, be obvious, and will, in part, appear hereinafter.

Broadly, the invention is directed to the coating of an iron-silicon sheet with a uniform layer applied from an aqueous slurry or suspension of an alumina powder obtained from the decomposition of an aluminum salt, or obtained by precipitation from an acid medium or obtained by appropriate treatment of an alumina-rich ore.

More particularly, the invention is directed to the use, as a coating material during the annealing of iron-silicon sheets to develop a cube-on-face (100) [001] orientation therein, of a fine particle alumina powder which is the decomposition product of an aluminum sulfate.

Still further, the invention is directed to the coating of an iron-silicon sheet prior to the orientation anneal to develop the (100) [001] texture with an alumina powder of fine particle size which is the product of a precipitation from solution wherein the solution is acidic.

The invention is further directed to the coating of an iron-silicon sheet prior to the orientation anneal which is to develop the (100) [001] texture, with an alumina powder slurry, the alumina powder being a calcined alumina-rich ore of fine particle size.

All of the alumina powders of this invention are produced using calcining temperatures of the order of 1000° C. to 1400° C. which is sufficiently high to yield the desired alpha-phase alumina; the alpha-phase being non-hygroscopic and therefore having no tendency for adsorption of moisture which has a detrimental effect on the cube texture anneal.

It is one aspect of the invention that aluminas made by the decomposition of aluminum sulfate do not react with the sheet surface during annealing and do permit growth of cube grains.

Since transformation to cube texture or (100) [001] orientation in iron-silicon electrical steels is principally a surface phenomenon, any coatings applied to the surface of the sheets will have some inhibiting effect on transformation. Coating both sides of a sheet will have a greater inhibiting effect than coating only one side of the sheet. In the continuous annealing of silicon-iron alloy sheet to obtain cube texture it is satisfactory practice to provide only one side of the sheet with the coating.

The aluminas in accordance with this invention must be in the form of fine powders to facilitate the formation of slurries. Generally, a particle size in the range of from 200 to 400 mesh fineness will be satisfactory. In the examples below the powders are of a fineness such that they pass through a 325 mesh sieve, and these powders readily form slurries.

*Example 1*

Five alumina powders are listed in Table I. Of these powders Samples A and B are products of the Bayer process for making alumina. Samples C and D are aluminas made by the decomposition of aluminum sulfate. Sample E is a material made by the following process involving the decomposition of aluminum sulfate: Commercial aluminum sulfate—$Al_2(SO_4)_3 18H_2O$ was dried for about 16 hours at 150 to 200° C.; this material was ball milled dry for one hour to produce particles having an average size of less than 325 mesh; the powder was then decomposed by heating between 1000 to 1100° C. in air for about three hours and then the material was then heated in air in a box furnace for 16 hours at 1150° C. The final product was alpha-phase alumina.

All five powders were mixed with water in proportion of 5 parts water to 1 part powder, by weight, to form slurries. Samples of a .013″ thick vacuum arc-melted iron-silicon alloy, hot rolled and then cold rolled into sheet, were coated on both sides and dried to form thin continuous alumina coatings. These coated steel samples were given an anneal of 16 hours at 1200° C. in dry hydrogen (−60° C. dew point) to develop cube texture. The following results were obtained:

TABLE I

| Coating: | Percent cube structure |
|---|---|
| A | 16.9 |
| B | 14.8 |
| C | 91.2 |
| D | 84.9 |
| E | 81.3 |

A portion of coatings A and B had reacted with the surfaces of the samples and formed a thin glass or slag film. The other coatings did not react with the steel. The alumina powder coatings were easily wiped off all sheets, except of course, that portion of the coatings A and B which had reacted to form glass or slag. When the coatings were wiped off sheets C, D and E the sheets had bright, shining bare surfaces. These results demonstrate the clear superiority of the alumina sulfate aluminas over the Bayer process aluminas in the annealing of iron-silicon alloys to produce cube-on-face (100) [001] textured sheets.

*Example II*

Keystone shaped punchings roughly about 11 inch by 20 inch of the same material as above were coated with slurries of aluminas B and C. The slurries consisted of about 3 parts by weight water to 1 part powder; the water contained 2% by weight polyvinyl alcohol in solution to enable more uniform suspension and as a binder. Ten punchings were coated with each slurry. These punchings were stacked and annealed in a commercial annealing furnace 24 hours at 1200° C. in dry hydrogen (−60° C. dew point). In this anneal coating B again reacted with the surface of the steel, forming a glass film, and substantially no transformation to cube structure was observed. No reaction with the surface of the steel occurred with coating C and extensive transformation to cube texture was observed.

*Example III*

Keystone punchings as described in Example II and 10 inch square sheets of a .011 inch thick open hearth iron-silicon alloy, cold rolled to gauge material were coated with slurries of powders C, D and E. The slurries were made up as in Example II. Five punchings of each type were coated on both sides with each slurry and three punchings of each type were coated on one side. These punchings were annealed in a stack in a production anneal similar to that of Example II. Of the keystone punchings, all transformed to more than 90% by volume cube structure. All the square punchings also transformed essentially completely to cube with the exception of the punchings coated with powder E which transformed to between 50 to 60% cube structure.

The above results clearly indicate that aluminas made by the decomposition of aluminum sulfate are greatly superior to Bayer alumina for slurry coating of cube-on-face steels and that aluminum sulfate decomposed alumina coatings are satisfactory for commercial cube-on-face production. The specific reasons for the differences between these aluminas are not as yet clearly defined, and the only reliable test of the effectiveness of any particular alumina powder is an actual test on the transformation of iron-silicon steel to cube-on-face orientation. Aluminum salts other than aluminum sulfate may be used in the decomposition process, such salts being aluminum chloride (hydrated), aluminum nitrate, and in fact, any aluminum salt which can be decomposed to the oxide; the principal group of aluminum salts which cannot be used are the aluminum phosphates. Alumina powder has been made by the decomposition of aluminum chloride (hydrated) and of aluminum nitrate, and the alumina so made has been used successfully as a separating material in the production of cube textured iron-silicon sheets.

Another source of the alumina is the group of reactions which result in the precipitation of hydrous alumina from acid solution.

*Example IV*

Aluminum sulfate in aqueous solution is treated with ammonia to a final pH of from 5 to 7 to precipitate hydrous alumina. The precipitate is washed in water at least once and then is heated to from 100° C. to 200° C. to drive off adsorbed water. Then the dried product is calcined at a temperature of about 1000° C. to 1400° C. to produce alpha-phase aluminum oxide. This alumina was used successfully in the annealing of cube texture material.

*Example V*

Another precipitation reaction is the treatment of aluminum sulfate in aqueous solution with sodium carbonate in which the final pH of the solution is less than 7. Hydrous alumina is also precipitated in this reaction, washed in water at least once, and is heated to drive off adsorbed moisture as stated in Example IV, and then calcined at a temperature of about 1000° C. to 1400° C. to produce alpha-phase aluminum oxide. This alumina was also successfully employed in the annealing of cube texture material.

The effect of acidity of precipitation is illustrated in the following cases:

In one case when hydrous alumina was made generally as described in Examples IV and V, and the hydrous alumina was precipitated from a solution having a final pH of about 4, the transformation to cube-on-face material obtained in annealing using the alumina ultimately resulting from this reaction was about 60%. When the pH of the solution was about 7, the transformation obtained was about 5%. When the pH of the solution was 10, substantially less than 5% transformation was obtained when the product alumina was employed.

Another material which has been found to be suitable in the cube texture anneal is, surprisingly, naturally occurring high grade bauxite mineral. This material requires only a relatively simple preliminary treatment.

Bauxite is a natural aggregate of aluminum bearing minerals, in which the aluminum occurs largely as hydrated oxides. The composition of bauxite varies from deposit to deposit in the ranges 30% to 70% $Al_2O_3$, 9% to 31% $H_2O$, 3% to 25% $Fe_2O_3$, 2% to 9% $SiO_2$ and 1% to 3% $TiO_2$ along with small amounts of various impurities. The water associated with these ores is normally removed by calcining. A high grade bauxite, within the meaning of this specification, will contain, after calcining, at least 86% $Al_2O_3$.

*Example VI*

Two high grade bauxite samples were investigated, having the following typical compositions in the fully calcined condition:

| | A, percent | B, percent |
|---|---|---|
| $Al_2O_3$ | 92.0 | 88.3 |
| $Fe_2O_3$ | 2.5 | 1.2 |
| $TiO_2$ | 2.8 | 3.0 |
| $SiO_2$ | 2.2 | 6.5 |
| Insoluble | 0.5 | 1.0 |

The samples were received in the form of coarse particles, partially calcined. The materials were ball milled to form a fine powder which had a reddish-brown color. The samples were then calcined at about 1200° C. in air to form the alpha-phase alumina. After this treatment the powders had a very light gray appearance. Sample A was tested for cube texture annealing in this condition. Both powders were then heated for 16 hours at 1200° C. in dry hydrogen to reduce any oxides that might otherwise be reduced in the cube texture anneal. Both samples turned a much darker gray, indicating a reduction of some oxides.

During the annealing treatment of silicon-iron to obtain cube texture, it is undesirable to have oxygen in the annealing atmosphere. The preliminary treatment of the bauxite at elevated temperature with hydrogen reduces the iron oxide therein to iron and thus eliminates one source of oxygen contamination during annealing.

Each of the powders was mixed with water to form a slurry and coated onto one or both sides of 0.013 inch thick 3% silicon-iron strips suitable for the cube texture anneal. The strips were annealed for 16 hours at 1200° C. in dry hydrogen. The following percentages of transformation to cube structure were obtained:

| Coating | Treatment | No. Coated Sides | Percent Cube |
|---------|-----------|------------------|--------------|
| A | 1,200° C. Air | 1 | 85 |
| A | ___do___ | 2 | 75 |
| A | 1,200° C. Air+H₂ reduction | 1 | 95 |
| A | ___do___ | 2 | 90 |
| B | ___do___ | 1 | 90 |
| B | ___do___ | 2 | 40 |

These results clearly demonstrate that satisfactory cube texture annealing can be obtained using properly treated bauxite coatings. None of these coatings had any marked tendency toward reaction or formation of glass. It will be observed from the above data that the bauxite of higher purity gave the better results, and that the hydrogen treatment generally was beneficial.

Bauxite for use in the cube texture anneal should have, after calcining, a minimum, by weight, of 86% $Al_2O_3$, no more than 8% $SiO_2$, no more than about 3% $TiO_2$ and no more than 10% $Fe_2O_3$. For best results, however, the amounts of $SiO_2$, $TiO_2$ and $Fe_2O_3$ present in the bauxite each should not exceed 3%.

The calcined bauxite in lumps of 4 to 10 mesh fineness is heated at from 1000° C. to 1400° C. in dry hydrogen to form alpha alumina and to reduce any oxides that would otherwise be reducible during the cube texture anneal. The bauxite thus treated is then crushed and ball milled to approximately 200 to 400 mesh fineness. The powder particles should be sufficiently fine to permit easy suspension in liquids to form a slurry. A particle size of 325 mesh fineness has proved satisfactory.

An alumina powder produced in accordance with this invention will be composed of discrete particles of generally spherical form and uniform size. The particle size should range from about 0.1 micron to 20 microns. When the coating is applied and dried it should be sufficiently porous so as to permit the annealing atmosphere access to the surface of the silicon-iron and when the annealing process is completed the coating should be easy to remove. The slurries of the invention may employ water alone as the liquid medium or volatile organic liquids such as alcohol, or aqueous solutions of such volatile organic liquids.

There has thus been presented a process for producing cube-on-face iron silicon steel which employs a particular alumina powder of specific form in the annealing procedure.

We claim as our invention:

1. In a process for the annealing of iron-silicon sheets in stacks or coils to obtain transformation to cube texture, coating the sheets on at least one side thereof with a slurry comprising water and alumina powder, the alumina powder having been obtained by the decomposition of an aluminum salt at elevated temperature and thereafter calcined to produce alpha-phase $Al_2O_3$, heating the coated sheet to dry the slurry leaving a continuous porous coating of non-reactive alumina powder on the sheet, and annealing the sheet to develop cube texture therein.

2. The process of claim 1 wherein the alumina powder is the decomposition product of aluminum sulfate.

3. The process of claim 1 wherein the alumina powder is the decomposition product of aluminum chloride (hydrated).

4. The process of claim 1 wherein the alumina powder is the decomposition product of aluminum nitrate.

5. In a process for the annealing of iron-silicon sheets in stacks or coils to obtain transformation to cube texture, coating the sheets on at least one side thereof with a slurry comprising water and alumina powder, the alumina powder being produced by calcining hydrous alumina which has been precipitated from a solution having a final pH of less than 7, the calcined alumina being in the alpha-phase and annealing the sheets at a temperature of from 1000° C. to 1400° C. for a length of time sufficient to cause substantially complete secondary recrystallization of the sheets.

6. In a process for the annealing of iron-silicon sheets in stacks or coils to obtain transformation to cube texture, coating the sheets on at least one side thereof with a slurry comprising water and alumina powder, the alumina powder being produced by calcining hydrous alumina at a temperature of from 1000° C. to 1400° C. to produce alpha-phase alumina, the hydrous alumina having previously been precipitated from a solution having a final pH of less than 7 by treating an aqueous solution of aluminum sulfate with ammonia, and annealing the sheets at a temperature of from 1000° C. to 1400° C. for a length of time sufficient to cause substantially complete secondary recrystallization of the sheets.

7. In a process for the annealing of iron-silicon sheets in stacks or coils to obtain transformation to cube texture, coating the sheets on at least one side thereof with a slurry comprising water and alumina powder, the alumina powder being produced by calcining hydrous alumina at a temperature of from 1000° C. to 1400° C. to produce alpha-phase alumina, the hydrous alumina having previously been precipitated from a solution having a final pH of less than 7 by treating an aqueous solution of aluminum sulfate with sodium carbonate, and annealing the sheets at a temperature of from 1000° C. to 1400° C. for a length of time sufficient to cause substantially complete secondary recrystallizatoin of the sheets.

8. In a process for the annealing of iron-silicon sheets in stacks or coils to obtain transformation to cube texture, coating the sheets on at least one side thereof with a slurry comprising water and a treated bauxite mineral material in powder form, the bauxite powder consisting essentially of a minimum of 86% $Al_2O_3$, a maximum of 3% $SiO_2$, a maximum of 3% $TiO_2$, a maximum of 3% $Fe_2O_3$ and the balance small amounts of incidental impurities, the bauxite powder having been calcined at a temperature sufficient to form alpha-phase $Al_2O_3$, and annealing the sheets at a temperature of from 1000° C. to 1400° C. for a length of time sufficient to cause substantially complete secondary recrystallization of the sheets.

9. The process of claim 8 wherein the bauxite powder, after calcining, is heated in a dry hydrogen atmosphere at a temperature of from 1000° C. to 1400° C.

10. In a process for the annealing of iron-silicon sheets in stacks or coils to obtain transformation to cube texture, coating the sheets on at least one side thereof with a slurry comprising water and a treated bauxite mineral material in powder form, the bauxite powder consisting essentially of a minimum of 86% $Al_2O_3$, no more than 8% $SiO_2$, no more than about 3% $TiO_2$, no more than 10% $Fe_2O_3$ and the balance small amounts of incidental impurities, the bauxite powder having been calcined at a temperature sufficient to form alpha-phase $Al_2O_3$, and annealing the sheets at a temperature of from 1000° C. to 1400° C. for a length of time sufficient to cause substantially complete secondary recrystallization of the sheets.

11. The process of claim 10 wherein the bauxite powder, after calcining, is heated in a dry hydrogen atmosphere at a temperature of from 1000° C. to 1400° C.

12. In a process for the annealing of iron-silicon sheets in stacks or coils to obtain transformation to cube texture, coating the sheets on at least one side thereof with a slurry comprising water and a treated high grade bauxite mineral material in powder form comprising not over 8% silica, the bauxite powder having been calcined at a temperature sufficient to form alpha-phase $Al_2O_3$, and annealing the sheets at a temperature of from 1000° C. to 1400° C. for a length of time sufficient to cause substantially complete secondary recrystallization of the sheets.

13. The process of claim 12 wherein the bauxite powder, after calcining, is heated in a dry hydrogen atmosphere at a temperature of from 1000° C. to 1400° C.

References Cited by the Examiner

UNITED STATES PATENTS

| | | | |
|---|---|---|---|
| 2,426,445 | 8/1947 | Frisch et al. | 117—127 |
| 2,875,113 | 2/1959 | Fitz | 148—113 |
| 2,906,645 | 9/1959 | Carpenter et al. | 117—127 |
| 2,992,951 | 7/1961 | Aspden | 148—111 |
| 2,992,952 | 7/1961 | Assmus et al. | 148—111 |
| 3,039,902 | 6/1962 | Miller et al. | 148—113 |
| 3,073,722 | 1/1963 | Hoehn et al. | 117—127 |

OTHER REFERENCES

Journal of Applied Physics—Supplement to V 31, No. 5, May 1960 (pp. 408 S–409 S, article by Kohler).

The Metallurgy of Aluminum and Aluminum Alloys, by Anderson, published by Henry Carey Baird & Co., Inc., 1925 (pp. 76–91 relied upon).

DAVID L. RECK, *Primary Examiner.*

N. F. MARKVA, *Assistant Examiner.*